(12) United States Patent
Gkinosatis

(10) Patent No.: US 9,290,320 B2
(45) Date of Patent: *Mar. 22, 2016

(54) WASTE PACKING SYSTEM AND FILM

(75) Inventor: Dimitris Gkinosatis, Koropi Attica (GR)

(73) Assignee: FLEXOPACK S.A. PLASTICS INDUSTRY, Koropi (GR)

(*) Notice: Subject to any disclaimer, the term of this patent is extended or adjusted under 35 U.S.C. 154(b) by 841 days.

This patent is subject to a terminal disclaimer.

(21) Appl. No.: 13/157,876

(22) Filed: Jun. 10, 2011

(65) Prior Publication Data

US 2012/0279181 A1 Nov. 8, 2012

(30) Foreign Application Priority Data

May 3, 2011 (EP) .................................. 11164527
May 16, 2011 (EP) .................................. 11166232

(51) Int. Cl.
| | |
|---|---|
| *B65B 51/26* | (2006.01) |
| *B65F 1/06* | (2006.01) |
| *B32B 27/08* | (2006.01) |
| *B32B 27/30* | (2006.01) |
| *B32B 27/32* | (2006.01) |
| *B32B 27/34* | (2006.01) |

(52) U.S. Cl.
CPC ................ *B65F 1/062* (2013.01); *B32B 27/08* (2013.01); *B32B 27/302* (2013.01); *B32B 27/304* (2013.01); *B32B 27/32* (2013.01); *B32B 27/34* (2013.01); *B32B 2250/24* (2013.01); *B32B 2307/31* (2013.01); *B32B 2307/7244* (2013.01); *B32B 2439/40* (2013.01); *B32B 2439/46* (2013.01); *B65F 2210/167* (2013.01); *B65F 2240/132* (2013.01)

(58) Field of Classification Search
USPC ........................................... 53/443; 428/219
See application file for complete search history.

(56) References Cited

U.S. PATENT DOCUMENTS

| | | |
|---|---|---|
| 2,380,054 A | 8/1943 | Lautmann |
| 2,376,185 A | 5/1945 | Randall |
| 3,299,194 A | 1/1967 | Golike |
| 3,356,192 A | 12/1967 | Cameron |
| 3,456,044 A | 7/1969 | Pahlke |
| 3,536,192 A | 10/1970 | Couper |
| 3,846,569 A | 11/1974 | Kaplan |
| 3,908,336 A | 9/1975 | Forslund |
| 3,956,229 A | 5/1976 | Bollen et al. |

(Continued)

FOREIGN PATENT DOCUMENTS

| | | |
|---|---|---|
| AU | 511 195 B2 | 7/1980 |
| EP | 0 005 660 | 11/1979 |

(Continued)

OTHER PUBLICATIONS

"Polybutylene terephthalate," Britannica Online Encyclopedia. pp. 1-3 (Accessed on Sep. 7, 2011) <http://www.britannica.com/EBchecked/topic/468341/polybutylene-terephthalate-PBT>.

(Continued)

*Primary Examiner* — Nathaniel Chukwurah
(74) *Attorney, Agent, or Firm* — Jenkins, Wilson, Taylor & Hunt, P.A.

(57) ABSTRACT

The present invention is directed to a waste packaging system, a method of storing waste and to a film for use in this system and method.

11 Claims, 3 Drawing Sheets

(56) References Cited

U.S. PATENT DOCUMENTS

| | | |
|---|---|---|
| 4,064,296 A | 12/1977 | Bornstein et al. |
| 4,207,364 A | 6/1980 | Nyberg |
| 4,254,869 A | 3/1981 | Heier |
| 4,362,834 A | 12/1982 | Lefevre et al. |
| 4,399,181 A | 8/1983 | Yoshimura et al. |
| 4,595,433 A | 6/1986 | Ford et al. |
| 4,612,221 A | 9/1986 | Biel et al. |
| 4,650,721 A | 3/1987 | Ashcroft et al. |
| 4,705,707 A | 11/1987 | Winter |
| 4,716,061 A | 12/1987 | Winter |
| 4,786,561 A | 11/1988 | Fong |
| 4,801,486 A | 1/1989 | Quacquarella et al. |
| 4,863,769 A | 9/1989 | Lustig et al. |
| 4,869,049 A | 9/1989 | Richards et al. |
| 4,911,979 A | 3/1990 | Nishimoto et al. |
| 4,912,149 A | 3/1990 | Robeson et al. |
| 4,934,529 A | 6/1990 | Richards et al. |
| 4,941,310 A | 7/1990 | Kristen |
| 4,976,898 A | 12/1990 | Lustig et al. |
| 4,977,022 A | 12/1990 | Mueller |
| 4,990,562 A | 2/1991 | Chou et al. |
| 5,001,192 A | 3/1991 | Sun |
| 5,034,281 A | 7/1991 | Kawasaki et al. |
| 5,079,051 A | 1/1992 | Garland et al. |
| 5,169,708 A | 12/1992 | Amaral et al. |
| 5,179,168 A | 1/1993 | Hirasawa |
| 5,256,351 A | 10/1993 | Lustig et al. |
| 5,256,428 A | 10/1993 | Lustig et al. |
| 5,296,580 A | 3/1994 | Matsunaga et al. |
| 5,298,202 A | 3/1994 | Schirmer |
| 5,302,402 A | 4/1994 | Dudenhoeffer et al. |
| 5,397,613 A | 3/1995 | Georgelos |
| 5,562,958 A | 10/1996 | Walton et al. |
| 5,593,747 A | 1/1997 | Georgelos |
| 5,645,788 A | 7/1997 | Bekele |
| 5,698,279 A | 12/1997 | Vicik |
| 5,834,077 A | 11/1998 | Babrowicz |
| 5,837,335 A | 11/1998 | Babrowicz |
| 5,851,610 A | 12/1998 | Ristey et al. |
| 5,888,615 A | 3/1999 | Mascarenhas et al. |
| 5,983,607 A | 11/1999 | Mihalov et al. |
| 6,013,378 A | 1/2000 | White et al. |
| 6,058,998 A | 5/2000 | Kristen |
| 6,065,272 A | 5/2000 | Lecomte |
| 6,074,715 A | 6/2000 | Lind et al. |
| 6,088,996 A | 7/2000 | Maruyama |
| 6,146,726 A | 11/2000 | Yoshii et al. |
| 6,221,410 B1 | 4/2001 | Ramesh et al. |
| 6,258,423 B1 | 7/2001 | Giori |
| 6,274,246 B1 | 8/2001 | Eggers et al. |
| 6,299,984 B1 | 10/2001 | Forloni |
| 6,346,285 B1 | 2/2002 | Ramesh |
| 6,406,763 B1 | 6/2002 | Wolf et al. |
| 6,458,437 B1 | 10/2002 | Ito et al. |
| 6,506,463 B1 | 1/2003 | Cahill et al. |
| 6,514,583 B1 | 2/2003 | Ahlgren et al. |
| 6,516,588 B2 | 2/2003 | Jensen et al. |
| 6,531,198 B2 | 3/2003 | Lind et al. |
| 6,534,137 B1 | 3/2003 | Vadhar |
| 6,558,760 B1 | 5/2003 | Paleari et al. |
| 6,572,959 B1 | 6/2003 | Buongiorno et al. |
| 6,592,975 B1 | 7/2003 | Ueyama et al. |
| 6,663,905 B1 | 12/2003 | Ennis et al. |
| 6,682,792 B2 | 1/2004 | Schmal et al. |
| 6,777,046 B1 | 8/2004 | Tatarka et al. |
| 6,960,635 B2 | 11/2005 | Stevens et al. |
| 6,984,695 B2 | 1/2006 | Brown et al. |
| 7,473,473 B2 | 1/2009 | Verrocchi |
| 7,611,770 B2 | 11/2009 | Kennedy et al. |
| 7,736,726 B2 | 6/2010 | McAllister et al. |
| 8,129,006 B2 | 3/2012 | Ginossatis |
| 8,697,211 B2 | 4/2014 | Gkinosatis |
| 2002/0038535 A1 | 4/2002 | Jensen et al. |
| 2002/0119334 A1 | 8/2002 | Shepard et al. |
| 2002/0172834 A1 | 11/2002 | Rivett et al. |
| 2003/0008084 A1 | 1/2003 | Vicik et al. |
| 2003/0012900 A1 | 1/2003 | Walfe et al. |
| 2003/0073785 A1 | 4/2003 | Okada et al. |
| 2003/0124452 A1 | 7/2003 | Nair et al. |
| 2003/0213804 A1 | 11/2003 | Chomik et al. |
| 2003/0218022 A1 | 11/2003 | Chomik et al. |
| 2003/0220453 A1 | 11/2003 | Ebara et al. |
| 2004/0020175 A1 | 2/2004 | Stravitz |
| 2004/0043238 A1 | 3/2004 | Wuest et al. |
| 2004/0048086 A1 | 3/2004 | Kennedy et al. |
| 2004/0065052 A1 | 4/2004 | Ramesh et al. |
| 2004/0074904 A1 | 4/2004 | Share et al. |
| 2004/0157077 A1 | 8/2004 | Roussos |
| 2004/0194433 A1 | 10/2004 | Chomik et al. |
| 2005/0044819 A1 | 3/2005 | Chomik et al. |
| 2005/0064123 A1 | 3/2005 | Chomik et al. |
| 2005/0129811 A1 | 6/2005 | Kraimer et al. |
| 2005/0147778 A1 | 7/2005 | Tai et al. |
| 2005/0191439 A1 | 9/2005 | Hirose et al. |
| 2005/0235611 A1 | 10/2005 | Roussos |
| 2005/0239961 A1 | 10/2005 | Saraf et al. |
| 2005/0271877 A1 | 12/2005 | Ginossatis |
| 2006/0010837 A1 | 1/2006 | Jurus |
| 2006/0172143 A1 | 8/2006 | Breese et al. |
| 2006/0177616 A1 | 8/2006 | Barber et al. |
| 2006/0177641 A1 | 8/2006 | Breese et al. |
| 2006/0199030 A1 | 9/2006 | Liang et al. |
| 2006/0199912 A1 | 9/2006 | Fuchs et al. |
| 2006/0254219 A1 | 11/2006 | Alipour et al. |
| 2006/0272767 A1 | 12/2006 | Kreitman et al. |
| 2006/0283153 A1 | 12/2006 | Nakano |
| 2006/0286323 A1 | 12/2006 | Siegel et al. |
| 2007/0042089 A1 | 2/2007 | Grah |
| 2007/0082150 A1 | 4/2007 | Ginossatis |
| 2007/0089688 A1 | 4/2007 | Nitzsche et al. |
| 2007/0178285 A1 | 8/2007 | Rasanen et al. |
| 2008/0003332 A1 | 1/2008 | Ginossatis |
| 2008/0070047 A1 | 3/2008 | Rehkugler et al. |
| 2008/0095960 A1 | 4/2008 | Schell et al. |
| 2008/0115463 A1 | 5/2008 | Wilson |
| 2008/0255311 A1 | 10/2008 | Chang et al. |
| 2008/0274314 A1 | 11/2008 | Gkinosatis |
| 2008/0274328 A1 | 11/2008 | Gkinosatis |
| 2008/0305220 A1 | 12/2008 | Gkinosatis |
| 2009/0013656 A1 | 1/2009 | Nasiatka et al. |
| 2009/0176117 A1 | 7/2009 | Gkinosatis |
| 2009/0191392 A1* | 7/2009 | Gkinosatis .................. 428/219 |
| 2009/0196962 A1 | 8/2009 | Gkinosatis |
| 2009/0240227 A1 | 9/2009 | Toro et al. |
| 2009/0263599 A1 | 10/2009 | Gkinosatis |
| 2010/0028574 A1 | 2/2010 | Gkinosatis |
| 2010/0032098 A1 | 2/2010 | Lalli et al. |
| 2010/0034939 A1 | 2/2010 | Gkinosatis |
| 2011/0159263 A1 | 6/2011 | Gkinosatis |
| 2012/0289645 A1 | 11/2012 | Tice et al. |
| 2013/0019568 A1* | 1/2013 | Gkinosatis .................. 53/450 |
| 2013/0209797 A1 | 8/2013 | Gkinosatis |
| 2013/0227916 A1* | 9/2013 | Gkinosatis .................. 53/469 |
| 2015/0010764 A1 | 1/2015 | Gkinosatis |
| 2015/0210454 A1 | 7/2015 | Gkinosatis |

FOREIGN PATENT DOCUMENTS

| | | |
|---|---|---|
| EP | 0 286 407 | 10/1988 |
| EP | 0 402 043 | 12/1990 |
| EP | 0 472 418 | 2/1992 |
| EP | 0 627 465 | 12/1994 |
| EP | 0 810 087 | 12/1997 |
| EP | 1 072 632 A2 | 1/2001 |
| EP | 0 930 349 B1 | 6/2003 |
| EP | 1 060 077 | 6/2003 |
| EP | 1 131 205 | 12/2004 |
| EP | 1 514 680 A1 | 3/2005 |
| EP | 1 415 930 | 4/2006 |
| EP | 1 770 116 A1 | 4/2007 |
| EP | 1 854 625 A1 | 11/2007 |
| EP | 08162162.5 | 8/2008 |
| EP | 1 985 440 A2 | 10/2008 |
| EP | 1 985 443 A2 | 10/2008 |

(56) References Cited

FOREIGN PATENT DOCUMENTS

| | | |
|---|---|---|
| EP | 1 995 058 A1 | 11/2008 |
| EP | 2 077 239 A2 | 7/2009 |
| EP | 2 077 297 A1 | 7/2009 |
| EP | 2 085 216 A1 | 8/2009 |
| EP | 2 111 979 A2 | 10/2009 |
| EP | 2 147 783 A1 | 1/2010 |
| GB | 792290 | 3/1958 |
| GB | 1 140 765 | 1/1969 |
| GB | 2 236 531 | 4/1991 |
| JP | 62107810 A | 5/1987 |
| JP | 03 200534 | 9/1991 |
| JP | 0726006 | 8/1995 |
| JP | 07196818 | 8/1995 |
| JP | 07206004 | 8/1995 |
| JP | 07206005 | 8/1995 |
| JP | 2002-234975 | 8/2002 |
| JP | 2003-159761 | 6/2003 |
| JP | 2005-047959 | 2/2005 |
| JP | 2005-335111 | 12/2005 |
| JP | 2006-247870 | 9/2006 |
| NZ | 567768 | 11/2009 |
| NZ | 567767 | 5/2010 |
| WO | WO96/01736 | 1/1996 |
| WO | WO97/46384 | 12/1997 |
| WO | WO98/21274 | 5/1998 |
| WO | WO98/21276 | 5/1998 |
| WO | WO99/44824 | 9/1999 |
| WO | WO99/57612 | 11/1999 |
| WO | WO00/61439 | 10/2000 |
| WO | WO01/23268 | 4/2001 |
| WO | WO02/26493 | 4/2002 |
| WO | WO03/020515 | 3/2003 |
| WO | WO2006/053885 | 5/2006 |
| WO | WO2006/075141 | 7/2006 |
| WO | WO2006/102152 | 9/2006 |
| WO | WO2007/053603 | 5/2007 |
| WO | WO2008/091321 | 7/2008 |
| WO | WO2008/118554 | 10/2008 |
| WO | WO 2011/029597 | 3/2011 |

OTHER PUBLICATIONS

"Polybutylene terephthalate (PBT)," 1 page <http://www.britannica.com/EBchecked/topic/468341/polybutylene-terephthalate-PBT> (Accessed on Jun. 13, 2012).

"Polymer Blend," IUPAC Compendium of Chemical Terminology. 2nd Edition(1997).

Extended European Search Report corresponding to European Patent Application No. 10193414.9-1217 dated May 9, 2011.

Interview Summary corresponding to U.S. Appl. No. 11/801,609 dated Jul. 31, 2012.

Interview Summary corresponding to U.S. Appl. No. 12/150,261 dated Jun. 12, 2012.

Interview Summary corresponding to U.S. Appl. No. 12/319,149 dated Jun. 15, 2012.

Interview Summary corresponding to U.S. Appl. No. 12/508,233 dated Apr. 26, 2012.

Official Action corresponding to U.S. Appl. No. 12/508,233 dated Jun. 6, 2012.

Official Action corresponding to U.S. Appl. No. 11/801,609 dated Jan. 30, 2012.

Official Action corresponding to U.S. Appl. No. 12/150,261 dated Jan. 31, 2012.

Official Action corresponding to U.S. Appl. No. 12/426,496 dated Feb. 7, 2012.

Official Action corresponding to U.S. Appl. No. 12/512,361 dated May 2, 2012.

Official Action corresponding to U.S. Appl. No. 12/322,347 dated May 15, 2012.

Official Action corresponding to U.S. Appl. No. 12/150,168 dated Aug. 14, 2012.

Official Action corresponding to U.S. Appl. No. 12/319,149 dated Aug. 27, 2012.

Official Action corresponding to U.S. Appl. No. 12/957,947 dated Sep. 25, 2012.

Official Action corresponding to U.S. Appl. No. 12/319,150 dated Mar. 14, 2013.

Official Action corresponding to U.S. Appl. No. 12/150,168 dated Apr. 26, 2013.

Search Report corresponding to French Patent Application No. 1059997 dated Jan. 16, 2012.

"Baymod L 2450," Product Data Sheet, LANXESS. (2 pages) (2007).

"Elvaloy resins," Product Data Sheet, DuPont Packaging & Industrial Polymers. (2 pages) (2010).

Interview Summary corresponding to U.S. Appl. No. 12/319,150 dated Sep. 6, 2013.

Official Action corresponding to U.S. Appl. No. 12/957,947 dated Jul. 24, 2013.

"15.13xEA—Ethylene Vinyl Acetate (EVA) Copolymers (>50% Ethylene)—European Adhesives," The ChemQuest Group, Inc. http://web.archive.org/web/20080219220919/http://www.chemquest.com/store/ethylene-vinyl-acetate-copolymers-european-adhesives.html (Aug. 26, 2011) (2 pages).

"DuPont™ Elvax® 3170," DuPont Packaging & Industrial Polymers. 3 pages (2004) http://web.archive.org/web/20060516114601/http://www2.dupont.com/Elvax/en_US/assets/downloads/vax3170.pdf.

Annonymous, "Advantages of metallocene ethylene [olymer resins in multilayer stretch films," Research Disclosure, Mason Publications, Hampshire, GB. vol. 419, No. 26 (1999).

Annonymous, "Some benefits from the use of metallocene ethylene polymers in blown and cast films," Research Disclosure, Mason Publications, Hampshire, GB. vol. 392, No. 54 (1996).

ASTM D 882-09. Standard Test Method for Tensile Properties of Thin Plastic Sheeting. American National Standards Institute. Jan. 2009. www.astm.org.

ASTM D 1003-07 "Haze and Luminous Transmittance of Transparent Plastics," ASTM International. pp. 1-7.

ASTM D 1525-07 "Vicat Softening Temperature of Plastics," ASTM International. pp. 1-9.

ASTM D 2732-03 "Unrestrained Linear Thermal Shrinkage of Plastic Film and Sheeting," ASTM International. pp. 1-5.

ASTM D 3418-08. Standard Test Method for Transition Temperatures and Enthalpies of Fusion and Crystallization of Polymers by Differential Scanning Calorimetry. American National Standards Institute. Dec. 2008. www.astm.org.

ASTM D 3985. Standard Test Method for Oxygen Gas Transmission Rate Through Plastic Film and Sheeting Using a Coulometric Sensor. American National Standards Institute. pp. 1-7. www.astm.org.

ASTM F 1927-07. Standard Test Method for Determination of Oxygen Gas Transmission Rate, Permeability and Permeance at Controlled Relative Humidity Through Barrier Materials Using a Coulometric Detector. American National Standards Institute. Aug. 2007. www.astm.org.

BS 2782-0:2004 "Methods of Testing Plastics," British Standards Institution. pp. 1-29 (2004).

English abstract of JP 2005-103902, USUI, Apr. 2005.

European Search Report corresponding to European Patent Application No. 08173056.6-2109 dated Mar. 16, 2009.

European Search Report corresponding to European Patent Application No. 08173057.4-2307 dated Sep. 22, 2009.

Extended European Search Report corresponding to European Patent Application No. 05021541.7-2115 dated Dec. 2, 2005.

Extended European Search Report corresponding to European Patent Application No. 08154742.4-2124 dated Jul. 2, 2009.

Extended European Search Report corresponding to European Patent Application No. 08156814 dated Oct. 9, 2008.

Extended European Search report corresponding to European Patent Application No. 09151289.7-2124 dated Jun. 8, 2009.

Harper, "Modern Plastics Handbook," McGraw-Hill: New York, New York. pp. 3.17-3.22 (2000).

Hough, M., and Dolbey, R., "Modern Plastics Compendium, vol. 1—Key Properties and Sources," Smithers Rapra Technology. pp. 87-124 (1995).

(56) References Cited

OTHER PUBLICATIONS

Huskić, M., and Šebenik, A., "Characterization of Crosslinked Ethylene-Vinylacetate Copolymers," Polymer International. vol. 31, No. 1 pp. 41-44 (1993).
Interview Summary corresponding to U.S. Appl. No. 12/150,261 dated Dec. 28, 2010.
Interview Summary corresponding to U.S. Appl. No. 12/150,261 dated Sep. 21, 2011.
Interview Summary corresponding to U.S. Appl. No. 12/319,149 dated Oct. 17, 2011.
Interview Summary corresponding to U.S. Appl. No. 12/319,150 dated Sep. 23, 2011.
Interview Summary corresponding to U.S. Appl. No. 12/322,347 dated Sep. 21, 2011.
Kipp, "Plastic Material Data Sheets," MatWeb (2004) (5 pages).
Machine Translation of JP 2005-103902, USUI, Apr. 2005.
Notice of Allowance corresponding to U.S. Appl. No. 11/528,741 dated Oct. 28, 2011.
Official Action corresponding to U.S. Appl. No. 11/528,741 dated Mar. 30, 2010.
Official Action corresponding to U.S. Appl. No. 11/528,741 dated Jan. 4, 2011.
Official Action corresponding to U.S. Appl. No. 11/528,741 dated May 18, 2011.
Official Action corresponding to U.S. Appl. No. 11/801,609 dated Sep. 15, 2009.
Official Action corresponding to U.S. Appl. No. 11/801,609 dated Feb. 5, 2010.
Official Action corresponding to U.S. Appl. No. 11/801,609 dated Jul. 15, 2010.
Official Action corresponding to U.S. Appl. No. 11/801,609 dated Jun. 20, 2011.
Official Action corresponding to U.S. Appl. No. 12/150,168 dated Feb. 16, 2011.
Official Action corresponding to U.S. Appl. No. 12/150,168 dated Sep. 23, 2011.
Official Action corresponding to U.S. Appl. No. 12/150,261 dated Oct. 27, 2009.
Official Action corresponding to U.S. Appl. No. 12/150,261 dated Jul. 7, 2010.
Official Action corresponding to U.S. Appl. No. 12/150,261 dated Mar. 22, 2011.
Official Action corresponding to U.S. Appl. No. 12/154,662 dated Mar. 29, 2011.
Official Action corresponding to U.S. Appl. No. 12/154,662 dated Aug. 18, 2011.
Official Action corresponding to U.S. Appl. No. 12/154,662 dated Jan. 18, 2012.
Official Action corresponding to U.S. Appl. No. 12/319,149 dated Oct. 15, 2009.
Official Action corresponding to U.S. Appl. No. 12/319,149 dated Jul. 7, 2010.
Official Action corresponding to U.S. Appl. No. 12/319,149 dated Mar. 22, 2011.
Official Action corresponding to U.S. Appl. No. 12/319,149 dated Dec. 2, 2011.
Official Action corresponding to U.S. Appl. No. 12/319,150 dated Oct. 15, 2010.
Official Action corresponding to U.S. Appl. No. 12/319,150 dated Apr. 26, 2011.
Official Action corresponding to U.S. Appl. No. 12/319,150 dated Nov. 4, 2011.
Official Action corresponding to U.S. Appl. No. 12/322,347 dated Sep. 14, 2010.
Official Action corresponding to U.S. Appl. No. 12/322,347 dated Mar. 16, 2011.
Official Action corresponding to U.S. Appl. No. 12/322,347 dated Oct. 26, 2011.
Official Action corresponding to U.S. Appl. No. 12/508,233 dated Mar. 9, 2011.
Official Action corresponding to U.S. Appl. No. 12/508,233 dated Nov. 23, 2011.
Official Action corresponding to U.S. Appl. No. 12/512,361 dated Aug. 31, 2011.
Official Action corresponding to U.S. Appl. No. 12/957,947 dated Jan. 17, 2012.
Petrie, "Handbook of Adhesives and Sealants," $2^{nd}$ Edition. McGraw-Hill: New York, New York. pp. 465-466 (2007).
Unisource—Moisture Barrier & Oxygen Barrier Transmission Rates; <http://www.unisourcelink.com/packaging/pdf/MoistureBarrier.pdf> (Retrieved on Jan. 10, 2012).
"Filling and sealing of containers" in Fellows, P.J. (2000). Food Processing Technology—Principles and Practice (2nd Edition). Woodhead Publishing.
Advisory Action corresponding to U.S. Appl. No. 12/319,150 dated Nov. 13, 2013.
Notice of Allowance corresponding to U.S. Appl. No. 12/150,168 dated Nov. 25, 2013.
Official Action corresponding to New Zealand Patent Application No. 626181 dated Jun. 18, 2014.
Official Action corresponding to United Kingdom Patent Application No. GB1020302.4 dated Jul. 2, 2014.
Official Action corresponding to U.S. Appl. No. 11/801,609 dated Nov. 29, 2013.
Official Action corresponding to U.S. Appl. No. 13/722,323 dated Mar. 27, 2014.
Official Action corresponding to U.S. Appl. No. 12/957,947 dated Apr. 24, 2014.
Official Action corresponding to U.S. Appl. No. 12/322,347 dated Aug. 1, 2014.
Official Action corresponding to U.S. Appl. No. 11/801,609 dated Sep. 24, 2014.
Official action corresponding to European Patent Application No. 10 193 414.9-1303 dated Oct. 29, 2014.
Official Action corresponding to U.S. Appl. No. 11/801,609 dated Jun. 12, 2015.
Official Action corresponding to U.S. Appl. No. 12/319,150 dated Jul. 22, 2015.
Official Action corresponding to U.S. Appl. No. 12/322,347 dated May 20, 2015.
Official Action corresponding to U.S. Appl. No. 12/957,947 dated Jan. 7, 2015.
Official Action corresponding to U.S. Appl. No. 13/523,462 dated Jan. 30, 2015.
Official Action corresponding to U.S. Appl. No. 13/682,160 dated Jun. 15, 2015.
Official Action corresponding to U.S. Appl. No. 13/722,323 dated Jan. 7, 2015.
Official Action corresponding to U.S. Appl. No. 13/722,323 dated Jul. 17, 2015.
Official Action corresponding to United Kingdom Patent Application No. GB1020302.4 dated Dec. 11, 2014.

\* cited by examiner

WASTE PACKING SYSTEM AND FILM

The present U.S. patent application claims priority to European Patent Application No. 11 164 527.1, filed May 3, 2011, and European Patent Application No. 11 166 232.6, filed May 16, 2011. The disclosure of each of these applications is incorporated herein by reference in its entirety.

The present invention is directed to a waste packaging system, a method of storing waste and to a film for use in this system and method.

A lot of waste products produce smells that are annoying to the environment. Examples are decayed food, kid nappies and cat litter.

In the prior art there are many films that could be used for protection from malodors. As it is well known in the art, the use of materials like EVOH, PVDC, polyacrylonitrile is recommended in order to not allow malodors escape from the container (eg bag or other configuration) and create an unpleasant atmosphere.

There are also a lot of known configurations of packing a certain length of film (eg 20 meters) in a compressed form (eg in a cassette). Examples of the representative cassettes are shown in U.S. Pat. No. 4,934,529 or U.S. Pat. No. 3,536,192.

Generally the cassette comprises a tubular core, casing wall, cassette bottom and lid. The film is stored in an area between tubular core, casing wall and cassette bottom in a compressed configuration. The flexible tubing is dispensed from the cassette. After the malodorous item is thrown into the bag the core or the lid is rotated and the flexible tube is twisted so that it closes as hermetically as possible the waste/environment area. To dispose the next diaper the user opens the lid and inserts the diaper. The previous pack is pushed downward and a new knot is formed by twisting the tube above the newly deposited diaper. Thus the device stores the diapers in a series of individually wrapped packages in the storage chamber, each package being separated from adjacent packages by twists in the tube.

Separation of one piece of flexible film from the next by means of a rotary knife is preferred.

In the prior art as a general rule the separation of each piece of the film in which the smelly item is contained from the next piece of the film is done with a twisting mechanism. This twist separates in a "hermetic" way the one piece from the other.

That is to say, it is a problem in the prior art techniques that the twist is never really hermetic. Odour molecules being extremely small have the capability to escape through the folds so the odour starts to be noticeable after a few days. There is still a need for a more hermetic way to isolate each individual pack with the next one.

Methods based on heat sealing have been proposed in the prior art as for example in EP 0005660. This concept is quite complicated as it uses sheaths to form discrete packages. The complex nature of this design makes it expensive to manufacture.

According to the prior art document U.S. Pat. No. 4,869,049, the use of electricity is to be avoided anywhere near babies therefore this approach has not been commercially successful. So, twisting is the preferred option for separating one pack from the next.

Heat sealing and cutting as means to separate each pack from the next is also an object of U.S. Pat. No. 6,516,588. In this reference there is no mention to the use of a low voltage battery. So, in general this method is not suitable enough as it involves electricity of high voltage and this is to be avoided for this sensitive application. Also, there is no reference to a low voltage battery.

Further, U.S. Pat. No. 6,516,588 does not refer to a suitable film that can be sealed efficiently and also through pleats and wrinkles (which are unavoidable during this kind of application).

According to this application "the plastic tubing may be any plastic tubing known in the art" as described in col. 4 lines 30-31.

Further, U.S. Pat. No. 4,612,221 refers to a thin film incorporating oxygen barrier material. The film comprises a cling agent (additive which offers cling property) and is suitable to be used as a food wrap. There is no mention of the possibility of the film to be used in a waste packing system. Also the cling additive makes it unsuitable in a waste packing system due to a number of reasons such as difficult unwinding, waxy feeling, more complicated production process etc.

The present invention provides a safe and simple apparatus that is quick and easy to operate, that stores soiled nappies in flexible tubing in a very hygienic way so that they can be disposed collectively after a certain amount of time. It also provides a suitable plastic film to be used accordingly.

SUMMARY OF THE INVENTION

The present invention in one aspect is directed to a device comprising
1. a dispensing apparatus wherein a plastic film with weight/surface ration less than 20 grams per square meter is stored
2. a bin wherein a fusion seal apparatus is located
3. a fusion seal apparatus comprising a battery with a maximum voltage of 20V.

The battery may be rechargeable or non-rechargeable. Preferably, it is rechargeable.

Also another object of the present invention is a method of packing waste items by
1. pulling out plastic film of weight/surface ration less than 20 grams per square meter from a dispensing apparatus
2. putting a waste item in a suitable length of the film
3. closing hermetically the plastic film with the use of a fusion seal where the seal is between a part of the film and another part of the same or other film, where the sealed parts are put sequentially in a bin.

The fusion seal is preferably done with a fusion seal apparatus comprising a battery with a maximum voltage of 20V.

Also another object of the present invention is a plastic film comprising at least a layer comprising at least 50% per weight of polyethylene homopolymer and/or copolymer, where the weight/surface ratio is less than 20 grams per square meter and the film can be heat sealed with the thermal energy transferred with a battery with a voltage of less than 20 V.

In a preferred embodiment, the present invention provides a multilayer plastic film comprising at least
1. an outer layer comprising of polyethylene homopolymer and/or copolymer
2. an internal layer comprising at least one oxygen barrier material
3. an inner layer comprising polyethylene homopolymer and/or copolymer, where the weight/surface ratio is less than 20 grams per square meter and the film can be heat sealed with the thermal energy transferred with a battery with a voltage of less than 20 V.

In a preferred embodiment, the outer and/or inner layer comprise at least 50% per weight of polyethylene homopolymer and/or copolymer.

The film preferably does not contain any cling agents.

DEFINITIONS

In this application the following definitions are used:

The term "waste" refers to any receptable that is useless and has to be disposed of properly. For example, the term waste includes diapers or other dirt.

The term "dispensing apparatus" refers to any apparatus where the film is stored before the application process. Examples are cassettes or reels.

The term "cassette" refers to any container wherein the film can be put. Often the film is in compressed form. The cassette is usually plastic and circular but other configurations may be possible.

The term "fusion seal" refers to the sealing of film by melting. A different kind of seal is by twisting the plastic film or by used an adhesive (in this latter case a kind of seal is made by pressure alone).

The term "bin" refers to a container where many waste packs are put one after the other. Each pack comprises a portion of the sealed film and of course the waste inside.

The term "film" refers to a flat or tubular flexible structure of thermoplastic material.

The term "voltage" between two points refers to the electrical driving force that could determine an electric current between these points.

The term "battery" refers to one or more electrochemical cells that convert stored chemical energy to electrical energy.

The term "rechargeable" refers to batteries that are designed in a way to be recharged and used multiple times.

The term "heat shrinkable" refers to a film that shrinks at least 10% in at least one of the longitudinal and transverse directions when heated at 90° C. for 4 seconds. The shrinkability is measured in water according to ASTM 2732. For temperatures like 100° C. or more, glycerine is used as a reference liquid.

The term "total heat shrinkability" refers to the sum of heat shrinkability at the MD direction and heat shrinkability at the TD direction. In all cases, ASTM 2732 is used for measurement of shrinkabilities.

The term "multilayer" refers to a film comprising 2 or more layers.

The phrase "longitudinal direction" or "machine direction" herein abbreviated "MD" refers to a direction along the length of the film.

The phrase "outer layer" refers to the film layer which comes in immediate contact with the outside environment (atmosphere).

The phrase "internal layer" as used herein refers to a film layer located between the outer and the inner layer of the multilayer film. It is not in contact with the atmosphere or the good to be packaged and usually comprises an oxygen barrier material.

The phrase "inner layer" refers to the film layer that comes in direct contact with the product packed. This is also called "sealing layer" as this layer must be hermetically sealed in order to protect the product from ingress of air.

The phrase "abuse layer" refers to a film layer whose main contribution to the film structure is to increase the abuse resistance property. The layer comprises materials which offer high impact strength to the film. Often, the abuse layer is an inner layer of the film, but it can form the outer layer as well. In some embodiments, it may form an internal layer as well.

The phrase "intermediate layer" refers to a film layer whose main contribution to the film structure is to increase the bonding between an oxygen barrier layer and another layer (eg abuse layer, inner layer, outer layer etc).

As used herein, the term "homopolymer" refers to a polymer resulting from polymerization of a single monomer.

As used herein, the term "copolymer" refers to a polymer resulting from polymerization of at least two different polymers.

As used herein, the term "polymer" includes both above types.

As used herein, the term "polyolefin" refers to any polymerized olefin, which can be linear, branched, cyclic, aliphatic, substituted or unsubstituted. More specifically, included in the term polyolefin are homopolymers of olefin, copolymers of olefin, copolymers of an olefin and a non olefinic comonomer (such as ester) etc.

Specific examples include polyethylene homopolymer, polypropylene homopolymer, polybutene homopolymer, ethylene alpha olefin copolymer, propylene alpha olefin copolymer, butene alpha olefin copolymer, ionomer, ethylene ester copolymer etc.

As used herein the term "polyethylene" identifies polymers consisting essentially of the ethylene repeating unit. The ones that have a density more than 0.940 are called high density polyethylene (HDPE), the ones that are have less than 0.940 are low density polyethylene (LDPE).

As used herein the phrase "ethylene alpha olefin copolymer" refers to polymers like linear low density polyethylene (LLDPE), medium density polyethylene (MDPE), very low density polyethylene (VLDPE), ultra low density polyethylene (ULDPE), metallocene catalysed polymers and polyethylene plastomers and elastomers.

As used herein the term "homogeneous ethylene alpha olefin copolymers" refer to ethylene alpha olefin copolymers having a molecular weight distribution less than 2.7 as measured by GPC. Typical examples of these polymers are AFFINITY from DOW or Exact from Exxon.

As used herein the phrase "styrene polymers" refers to styrene homopolymer such as polystyrene and to styrene copolymers such as styrene-butadiene copolymers, styrene-butadiene-styrene copolymers, styrene-isoprene-styrene copolymers, styrene-ethylene-butadiene-styrene copolymers, ethylene-styrene copolymers and the like.

As used herein the phrase "ethylene methacrylate copolymers" refers to copolymers of ethylene and methacrylate monomer. The monomer content is less than 40%.

As used herein the phrase "ethylene vinyl acetate copolymer" or EVA refer to copolymers of ethylene and vinyl acetate.

As used herein the phrase "ethylene ester copolymer" includes any polymer made from ethylene and ester monomers. It is obvious that this term includes EVAs, EMAs and other polymers.

As used herein the term "oxygen barrier polymer" refers to polymers which have the property to limit the passage of oxygen through a film or a layer comprising the polymer. Common materials, are EVOH, PVDC or polyamide. Those polymers usually are comprised in at least one internal layer of the multilayer film.

As used herein, the term EVOH refers to saponified products of ethylene vinyl ester copolymers. The ethylene content is typically in the range of 25 to 50% per mol. All the later references to EVOH ethylene content will be in % per mol.

As used herein the term PVDC refers to a vinylidene chloride copolymer wherein a major amount of the copolymer comprises vinylidene chloride and a minor amount of the copolymer comprises one or more monomers such as vinyl chloride and/or alkyl acrylates and methacrylates.

As used herein the term "polyamide" refers to homopolymers and copolymers. Polyamide 6, polyamide 66, polyamide 12, polyamide 6/66, polyamide 6/12, polyamide elastomers, MXD polyamides and other copolymers are specifically useful for the invention.

As used herein the term "polyester" refers to polymers comprising terephthalate units. Examples of polyesters are PET (polyethylene terephthalate), PBT (polybutylene terephthalate), polyester elastomer (block copolymer comprising ester or ether units), PTT and other similar polymers.

As used herein, the term "ionomer" comprises the copolymers of ethylene and methacrylic or acrylic acid being metal neutralized. An example of such material is Surlyn from Dupont.

As used herein, the term "polypropylene" refers to polymers incorporating propylene structural units. Examples of these, are homo polypropylenes, random copolymers of propylene and ethylene, block copolymers of propylene and ethylene, copolymers or blends of propylene and rubber (such as blends of polypropylene and ethylene propylene rubber), propylene ethylene alpha olefin terpolymers and others.

These polymers may be isotactic, syndiotactic or atactic. Isotactic is preferred.

In line with the above definition, it is noted that for the purposes of the present invention, the term "inner layer" is to be regarded as an additional outer layer of the multilayer film, which is in direct contact with the item to be packaged (i.e. an outer layer of the film which is located on the inside after a packaging process, not exposed to the environment).

As used herein the term "substantially non resilient material" refers to materials or material compounds comprising at least 40% per weight inorganics like calcium carbonate, titanium dioxide, wollastonite, mica, glass fibers, dolomite and the like. The rest percentage per weight can be polyethylene, polypropylene, styrene polymer or other thermoplastic material.

All measurement methods mentioned herein are readily available for the skilled person. For example, they can be obtained from the American National Standards Institute at: www.webstore.ansi.org All percentages are based on weight per weight ratio, except when otherwise stated.

DETAILED DESCRIPTION OF THE INVENTION

Figure 1:
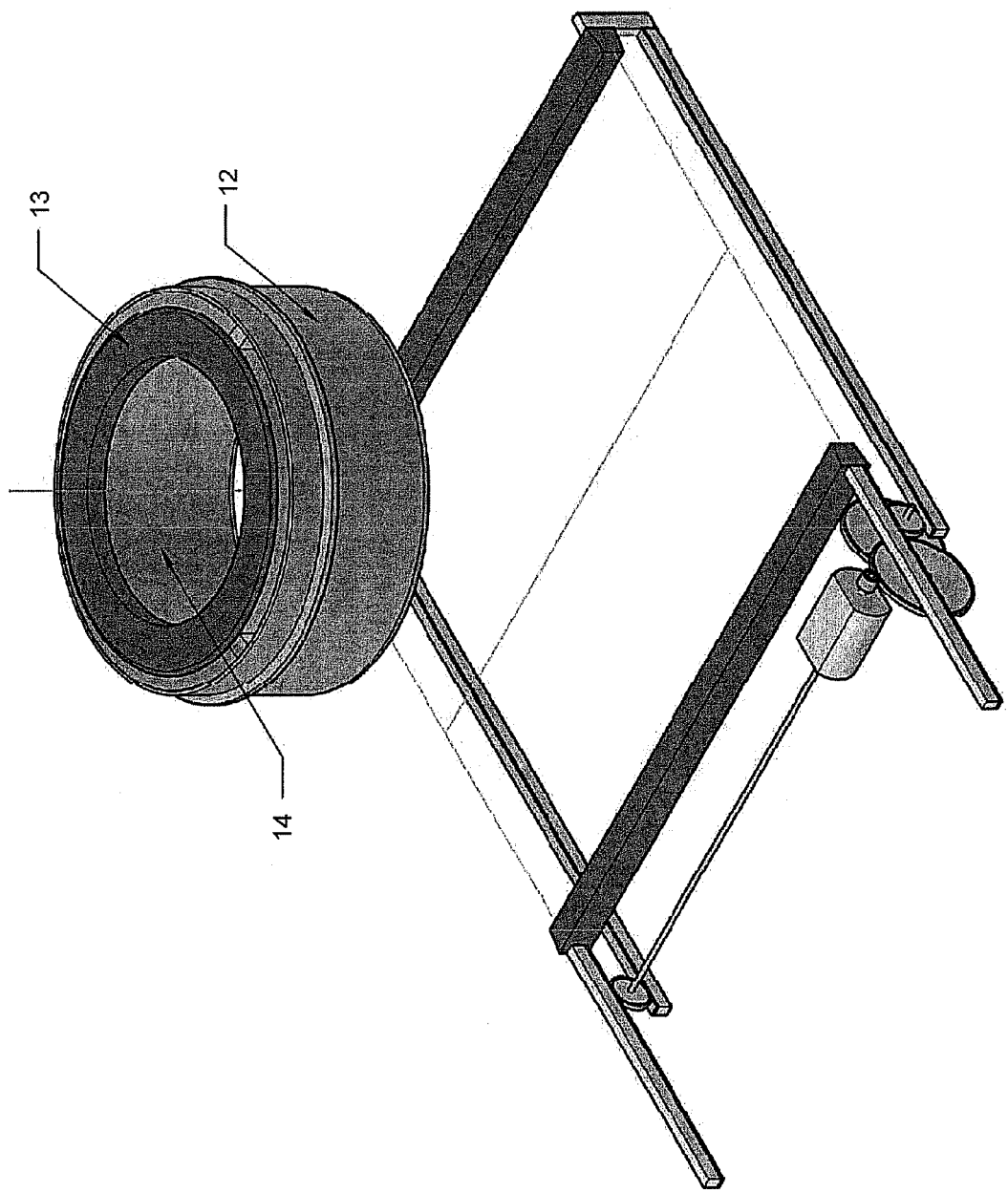
FIG. 1 is a perspective view of an embodiment of a presently disclosed apparatus.

The present invention is directed to a device comprising
1. a dispensing apparatus where a plastic film of weight/surface ration less than 20 grams per square meter is stored
2. a bin where a fusion seal apparatus is located
3. a fusion seal apparatus comprising a battery with a maximum voltage of 20V.

The battery preferably is rechargeable.

Another aspect of the present invention is a method of packing waste items by
1. pulling out plastic film of weight/surface ration less than 20 grams per square meter from a dispensing apparatus
2. putting a waste item in a suitable length of the film
3. closing hermetically the plastic film with the use of a fusion seal where the seal is between a part of the film and another part of the same or other film,
    where the sealed parts are put sequentially in a bin.

The fusion seal is preferably done with a fusion seal apparatus comprising a battery with a maximum voltage of 20V.

A still further aspect of the present invention is a method of packing waste items by
1. pulling out plastic film of weight/surface ration less than 20 grams per square meter from a dispensing apparatus
2. putting a waste item in a suitable length of the film
3. closing hermetically the plastic film with the use of a fusion seal where the seal is between a part of the film and another part of the same or other film where the film is able to be sealed through pleats and wrinkles,
    where the sealed parts are put sequentially in a bin.

A preferred embodiment of the present invention is a method of packing waste items by
1. pulling out plastic film of weight/surface ration less than 15 grams per square meter from a dispensing apparatus
2. putting a waste item in a suitable length of the film
3. closing hermetically the plastic film with the use of a fusion seal where the seal is between a part of the film and another part of the same or other film where the film is able to be sealed through pleats and wrinkles,
where the sealed parts are put sequentially in a bin.

Also another object of the present invention is a plastic film comprising at least a layer comprising at least 50% per weight of polyethylene homopolymer or copolymer, where the weight/surface ratio is less than 20 grams per square meter and the film can be heat sealed with the thermal energy transferred with a battery with a voltage of less than 20 V.

Also another object of the present invention is a multilayer plastic film comprising at least
1. an outer layer comprising polyethylene homopolymer and/or copolymer
2. an internal layer comprising at least one oxygen barrier material
3. an inner layer comprising polyethylene homopolymer and/or copolymer,
where the weight/surface ratio is less than 20 grams per square meter and the film can be heat sealed with the thermal energy transferred with a battery with a voltage of less than 20 V.

In a preferred embodiment, one or both of the outer and inner layers comprise at least 50% per weight of polyethylene homopolymer and/or copolymer.

Dispensing Apparatus

A dispensing apparatus of the present invention preferably has the form of a cassette. Nevertheless, other dispensing apparatus are also possible in which a cassette is not used. For example the film can be wound in the form of a mini roll around a paper core. Alternatively, two such mini rolls may comprise the film in such a way that the film wound in the first mini roll will heat seal to the film that is wound in the second mini roll.

Cassette

In a preferred embodiment the cassette useful for the invention is circular in shape (see FIG. 1). Preferably it is made by plastic, eg polypropylene.

It is also possible to be manufactured from other means more friendly to the environment such as paper, biodegradable plastic or non biodegradable plastic where a percentage of "degrading" additives have been added.

Generally, the cassette comprises a tubular core (see reference number 14 in FIG. 1), casing wall (see reference number 12 in FIG. 1), cassette bottom and lid (see reference number 13 in FIG. 1). The film is stored in an area between tubular core, casing wall and cassette bottom in a compressed configuration. The flexible tubing is dispensed from the cassette.

In a further preferred embodiment of the invention the cassette comprises a malodor counteractant useful for absorbing, adsorbing or masking the smell of the waste.

In a preferred embodiment of the invention the film inside the cassette the film is in compressed configuration.

Seal Apparatus

A preferred version of the sealing apparatus of the present invention is an apparatus capable of impulse sealing. An impulse sealer is a jaw sealer backed with resilient silicone rubber. Electric current flows through Nichrome ribbon stretched over one over one or both surfaces and covered with high temperature release film and fabric.

Another preferred version of the seal apparatus is wire or knife sealing. According to this method a hot wire or knife seals and cuts the film.

Other methods for the seal apparatus that could be used according to the invention include bar sealing, band sealing, ultrasonic sealing, friction sealing, gas sealing, contact sealing, hot melt sealing, pneumatic sealing, dielectric sealing, magnetic sealing, induction sealing, radiant sealing, solvent sealing etc. For these methods please refer to the Wiley Encyclopedia of packaging technology, edition 1997.

In a preferred embodiment of the invention the electric current necessary for the heat sealing and fusion is provided through a rechargeable battery. The voltage of the rechargeable battery is preferably equal or less than 20 V, even more preferably less than 16 V, even more preferably less than 12V.

In a preferred version of the invention the temperature for the heat seal is less than 100° C., preferably less than 90° C., preferably less than 80° C.

In a further preferred version of the invention, the sealing time is less than 5 seconds, more preferably less than 3 seconds, more preferably less than 1 second.

In a further preferred version of the invention, the cutting of each pack to the previous one is done simultaneously with the sealing by the use of a wire/knife configuration. In another version, there is no cutting. In this case all the packs are put together inside the bin in a single line.

The use of a rechargeable battery of low voltage assures a safe procedure that is more user friendly than household electricity.

Another alternative possibility of the invention is the use of more than one heat seal to make an individual pack. So two, three or four seals are possible. In the case of three or four seals, the film should be in a "single sheet" configuration instead of "flexible tubing".

Figure 2:
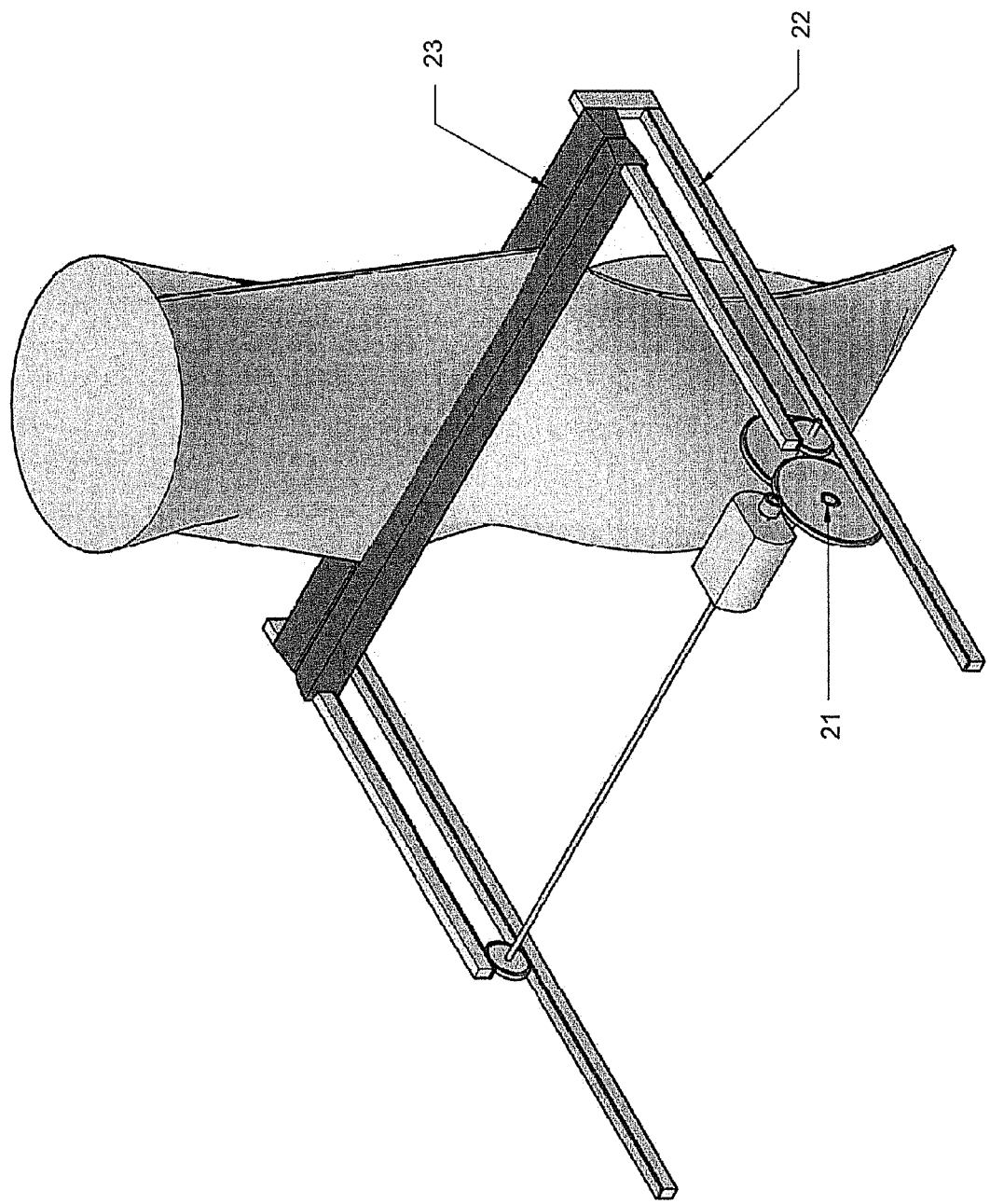
FIG. 2 is a perspective view of an embodiment of a presently disclosed apparatus.
Figure 3:
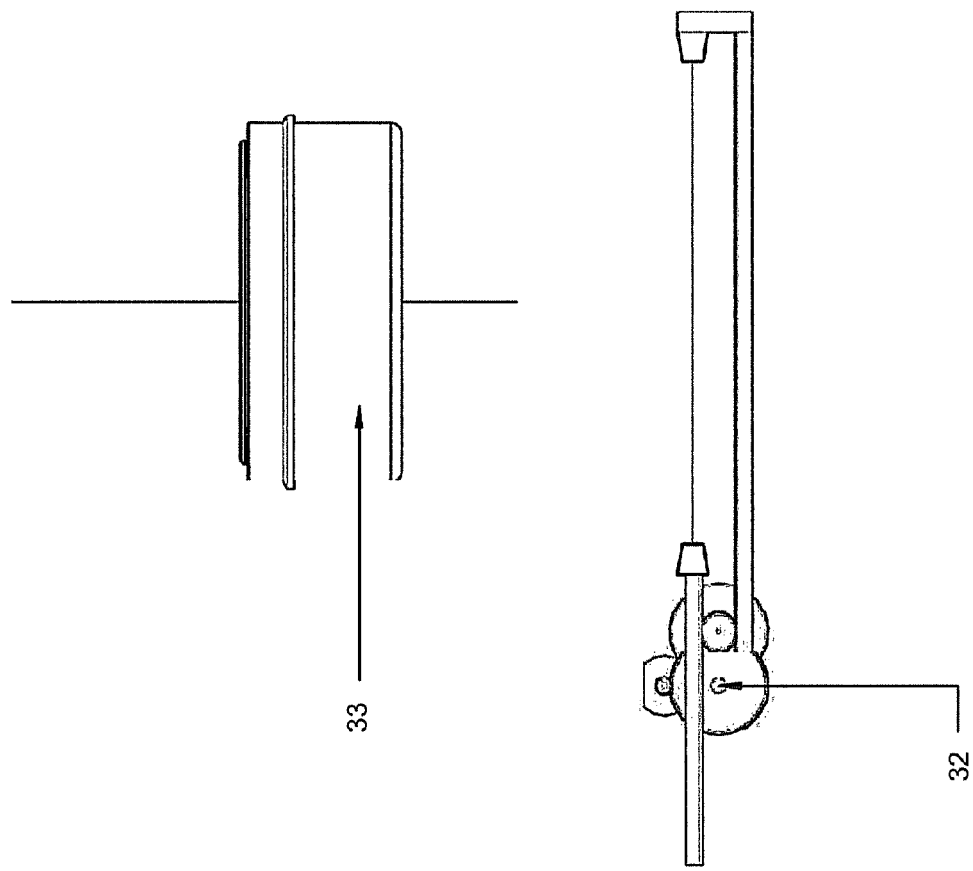
FIG. 3 is a side view of an embodiment of a presently disclosed apparatus.
Figure 3:
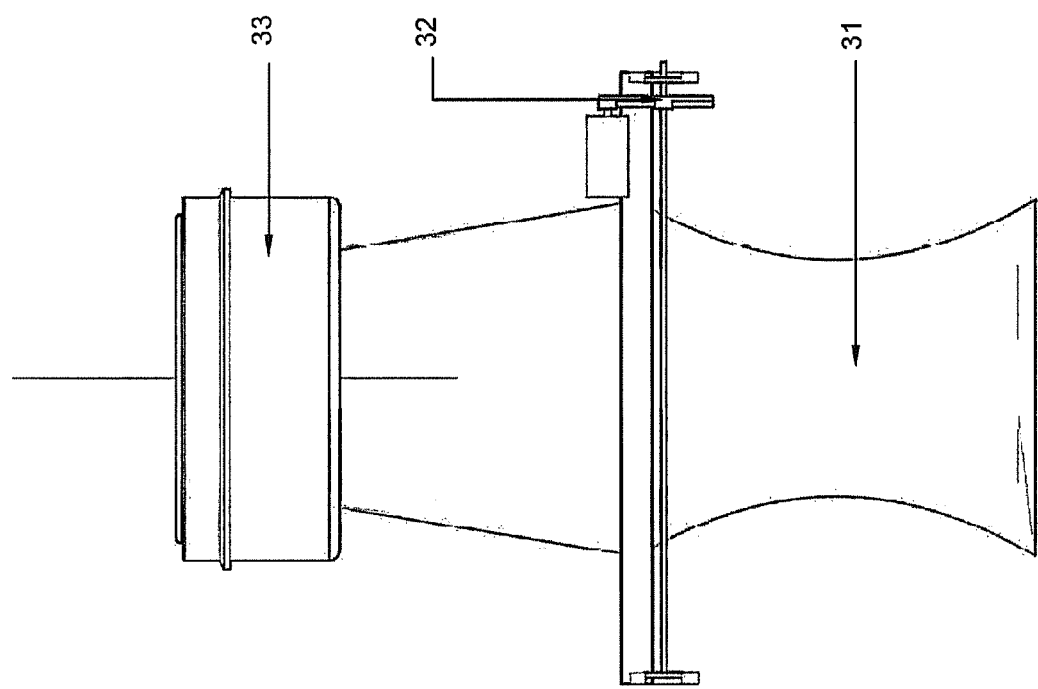

In FIG. 2 there is further explanation of the sealing apparatus. The two sealing jaws (see reference number 23) are heat sealing the flexible tubular film. The sealing jaws are movable on a railway (see reference number 22) and the movement is controlled through as gear reducer (see reference number 21). This is also displayed in FIG. 3 from another view.

The activation of the sealing mechanism can be done by the person using the apparatus preferably by pushing an activation mechanism (eg a button or a lever) either by hand or by foot. The activation mechanism provokes by preferably mechanical or pneumatic transmission system the movement of the sealing jaws therefore allowing the fusion seal to occur. Electrical transmission is also possible by using a battery as a source of power.

Film Characteristics

The basic characteristics a film should have in order to be used in the particular case are
1. Barrier to odours
2. To have the proper deadfold properties (non resilient) so that is compressed efficiently in the cassette if a cassette is used as a dispensing apparatus.
3. To have sufficient mechanical properties (eg tensile strength at break, elongation).
4. To have sufficient sealing properties as to be sealed with a low voltage rechargeable battery. Also the sealing properties must be sufficient to seal through wrinkles or pleats that are inevitable for this kind of application.

We have surprisingly found that all these features can be achieved with a very lightweight multilayer film with weight per surface ratio less than 20 grams per square meter, preferably less than 18 grams per square meter. This is extremely beneficial for the environment as multilayer films are extremely difficult to be produced with so small weight per surface.

In order for a film to be able to heat seal hermetically to itself or to other film with the power generated by a low voltage battery and also be able to keep the other critical characteristics (odour barrier, sealability through pleats and wrinkles, mechanical strength) it should combine the following characteristics:
1. Comprise an internal layer comprising at least one oxygen barrier material
2. Comprise one outer layer comprising more than 50% per weight polyethylene homopolymer and/or copolymer and one inner layer comprising more than 50% per weight polyethylene homopolymer and/or copolymer
3. Have a weight/surface ratio of less than 20 grams per square meter.
4. The film can be heat sealed with the thermal energy transferred with a battery with a voltage of equal or less than 20 V.

According to a further aspect the present invention is directed to a multilayer film with weight less than 15 g/m$^2$ which:
1. Comprises a layer comprising at least one oxygen barrier material
2. Comprise one outer layer comprising more than 50% per weight polyethylene homopolymer and/or copolymer and one inner layer comprising more than 50% per weight polyethylene homopolymer or copolymer
3. The film can be heat sealed with the thermal energy transferred with a battery with a voltage of equal or less than 20 V.

According to a further aspect the present invention is directed to a multilayer film with weight less than 13 g/m$^2$ which:
1. comprises a high oxygen barrier layer comprising at least one oxygen barrier material
2. comprise two outer layers comprising more than 50% per weight polyethylene homopolymer or copolymer
3. the film can be heat sealed with the thermal energy transferred with a battery with a voltage of equal or less than 20 V.

In a further preferred embodiment, the film comprises the construction:
OUTER LAYER/ABUSE LAYER/INTERMEDIATE LAYER/BARRIER LAYER/INTERMEDIATE LAYER/ABUSE LAYER/INNER LAYER In another preferred embodiment, the film comprises the construction
OUTER LAYER/INTERMEDIATE LAYER/BARRIER LAYER/INTERMEDIATE LAYER/INNER LAYER Detailed description of layers:

Barrier (Internal) Layer

In a preferred version of the invention, the oxygen barrier material in the barrier (internal) layer is EVOH, PVDC or polyamide. The EVOH used preferably has an ethylene content less than 48%, more preferably less than 44%, more preferably less than 38%, more preferably from 27 to 32% ethylene.

The oxygen barrier material preferably has a weight of less than 3 more preferably less than 2 $g/m^2$ and even more preferably less than 1.5 $g/m^2$.

Outer Layer

In a preferred version, the outer layer comprises at least 50% per weight polyethylene homopolymer or copolymer.

In a further preferred version, the weight of the outer layer is less than 6, more preferably less than 5 $g/m^2$.

In a further preferred version, the polyethylene is a copolymer or a blend of different monomers or polymeric structures. This blending may take place during polymerization or as a later stage.

In a further preferred version the polyethylene is a copolymer of ethylene and butene or a copolymer of ethylene and hexene or a copolymer of ethylene and octene.

In a further preferred version the polyethylene has a density of between 0.885 and 0.960 $g/m^3$, more preferably 0.910 to 0.940 $g/m^3$.

Inner Layer

Preferred materials for the inner layer include polyethylene homopolymer or copolymers, such as low density polyethylene, high density polyethylene, ethylene ester copolymer, ethylene alpha olefin copolymer and ethylene propylene copolymers. Ethylene based ionomers and ethylene styrene copolymers are also possible. Ethylene alpha olefin copolymer is particularly preferred.

According to a further embodiment, the present invention is of the same configuration where the inner layer comprises a "substantially non resilient material" (SNR).

In a preferred version of the invention, the SNR material is at least 10 percent, preferably at least 20, preferably at least 30 percent per weight of the inner layer.

Intermediate Layer

In the intermediate layers, typical adhesive resins like maleic anhydrite modified polyolefins may be used. Typical examples are BYNEL from Dupont and OREVAC from Arkema.

In another preferred version of the invention, polyamide could be used as intermediate layer.

Abuse Layer

In a multilayer configuration where abuse layers are also present, these layers may comprise polyethylene and polypropylene homopolymers or copolymers. Polyamides are also possible.

General

Additives well known in the art may be used in one or more layers of the present invention. Slip additives, antiblock additives, antifog, polymer processing aids may be used if pertinent. Antimicrobial additives may also be used in one or more of the layers to inhibit the microbe formation. Preferably the antimicrobial is put on the side where the waste is in direct vicinity.

In order to increase the mechanical properties the film may be crosslinked with one of the following methods.

E-beam radiation, gamma radiation, moisture crosslinking using silane grafting compounds, peroxide crosslinking.

The film may be in tubular form or sealed at the edges or single sheet configuration. Centrefold configuration is also possible.

The preferred production method for the film is the hot blown film method, which is well known in the art. Other methods like extrusion through flat cast die is also possible. The hot blown film method allows orientation of the plastic from the melt state. Biaxially oriented film such as those produced by double bubble or tenter frame method are not really efficient for the application during the much higher complexity of the process which renders the production cost much higher.

As outlined above, the inner and outer layers of the present invention are substantially free of "cling" additives meaning additives that allow the layer adhere to itself by pressing force without the need of fusion seal. Addition of such additives is costly and complicated. Also it makes the whole process much less friendly due to the tacky nature of the cling additive.

EXAMPLES

A 5 layer film is produced in a commercial hot blown film line with the following recipe Inner layer, 80% EAO1+15% SNR1+5% ADDITIVES
Adjacent layer 100% ADH 1
Barrier layer EVOH 1
Adjacent layer 100% ADH1
Outer layer 100% EAO1
See table 1

The thickness of the structure is 4/1.5/1.5/1.5/4 starting from the inner and going to the outer layer. The weight of the film is 12.145 $g/m^2$.

TABLE 1

| Type | Description | Density $g/cm^3$ |
| --- | --- | --- |
| EAO1 | Ethylene octene copolymer | 0.92 |
| SNR1 | Calcium carbonate compound | 1.6 |
| AD1 | LLDPE mod. Adhesive tie | 0.92 |
| EVOH 1 | EVOH with 32% ethylene | 1.19 |
| EVOH 2 | EVOH with 29% ethylene | 1.2 |

Example 2

A 5 layer film is produced in a hot blown film commercial line with the following recipe Inner layer, 80% EAO1+15% SNR1+5% ADDITIVES
Adjacent layer 100% ADH 1
Barrier layer EVOH 2
Adjacent layer 100% ADH1
Outer layer 80% EAO1+15% SNR1+5% ADDITIVES The thickness of the structure is 5/1.5/1.5/1.5/3 starting from the inner and going to the outer layer.

The weight of the material is 12.385 $g/m^2$.

Example 3

A 5 layer film is produced in a hot blown film commercial line with the following recipe Inner layer, 80% EAO1+15% SNR1+5% ADDITIVES
Adjacent layer 100% ADH 1
Barrier layer EVOH 2

Adjacent layer 100% ADH1

Outer layer 80% EAO1+15% SNR1+5% ADDITIVES

The thickness of the structure is 5/3/1.5/3/5 starting from the inner and going to the outer.

The weight of the material is 17.1 g/m$^2$.

Tests

1. Tensile strength and elongation test is done according to ASTM D 882.
2. Odour test is done in the way described below.

Test 1.

Tensile strength and elongation is measured as per ASTM D882.

MD stands for machine direction, whereas TD stands for transverse direction.

| EXAMPLE | TENSILE STRENGTH (MD) | ELONGATION (MD) | TENSILE STRENGTH (TD) | ELONGATION (TD) |
|---|---|---|---|---|
| 1 | 22 | 250 | 21 | 630 |
| 2 | 21 | 225 | 19.8 | 550 |
| 3 | 25 | 190 | 23 | 520 |

Odour Testing 10 soiled diapers are put in a film of the present invention and also in a commercially sold film. The commercially sold film is believed to be monolayer.

The packs are put in PVDC comprising bags, so the odour cannot escape during the time of the evaluation.

The bags are opened 3 days after the soiling of the diapers and smell was evaluated by a 5 member panel.

The packs made from examples 1 and 2 were found substantially less smelly than the commercially sold ones.

Sealing Testing

The sealing testing was done in comparison with a commercial film specialized for the particular application with a weight/surface ratio of 21.9 g/m$^2$. For the testing two sealing jaws that used the energy produced by a battery of 20 V were used.

It was surprisingly found that the film of examples 1, 2 and 3 were able to seal efficiently even through wrinkles with the sealing apparatus. On the other hand, the film of 21.9 g/m$^2$ was not able to seal efficiently. If the sealing time was increased (something which is not desirable according to the invention) the seal was "burned".

What is claimed is:

1. A waste packaging device comprising:
    a. a dispensing apparatus where a plastic film of a weight/surface ratio of less than 20 grams per square meter is stored;
    b. a bin where a fusion seal apparatus is located; and
    c. a fusion seal apparatus comprising a battery with a maximum voltage of equal to or less than 20V.
2. The waste packaging device of claim 1, wherein the battery is rechargeable.
3. The waste packaging device of claim 1, where the dispensing apparatus has a form of a cassette.
4. The waste packaging device of claim 1, wherein the voltage is less than 16 V.
5. The waste packaging device of claim 1, wherein the voltage is less than 12V.
6. The waste packaging device of claim 1, where a temperature for a heat seal is set to less than 100° C.
7. The waste packaging device of claim 1, where a temperature for a heat seal is set to less than 90° C.
8. The waste packaging device of claim 1, where a temperature for a heat seal is set to less than 80° C.
9. The waste packaging device of claim 1, where a sealing time is set to less than 5 seconds.
10. The waste packaging device of claim 1, where a sealing time is set to less than 3 seconds.
11. The waste packaging device of claim 1, where a sealing time is set to less than 1 second.

* * * * *